United States Patent Office 3,189,680
Patented June 15, 1965

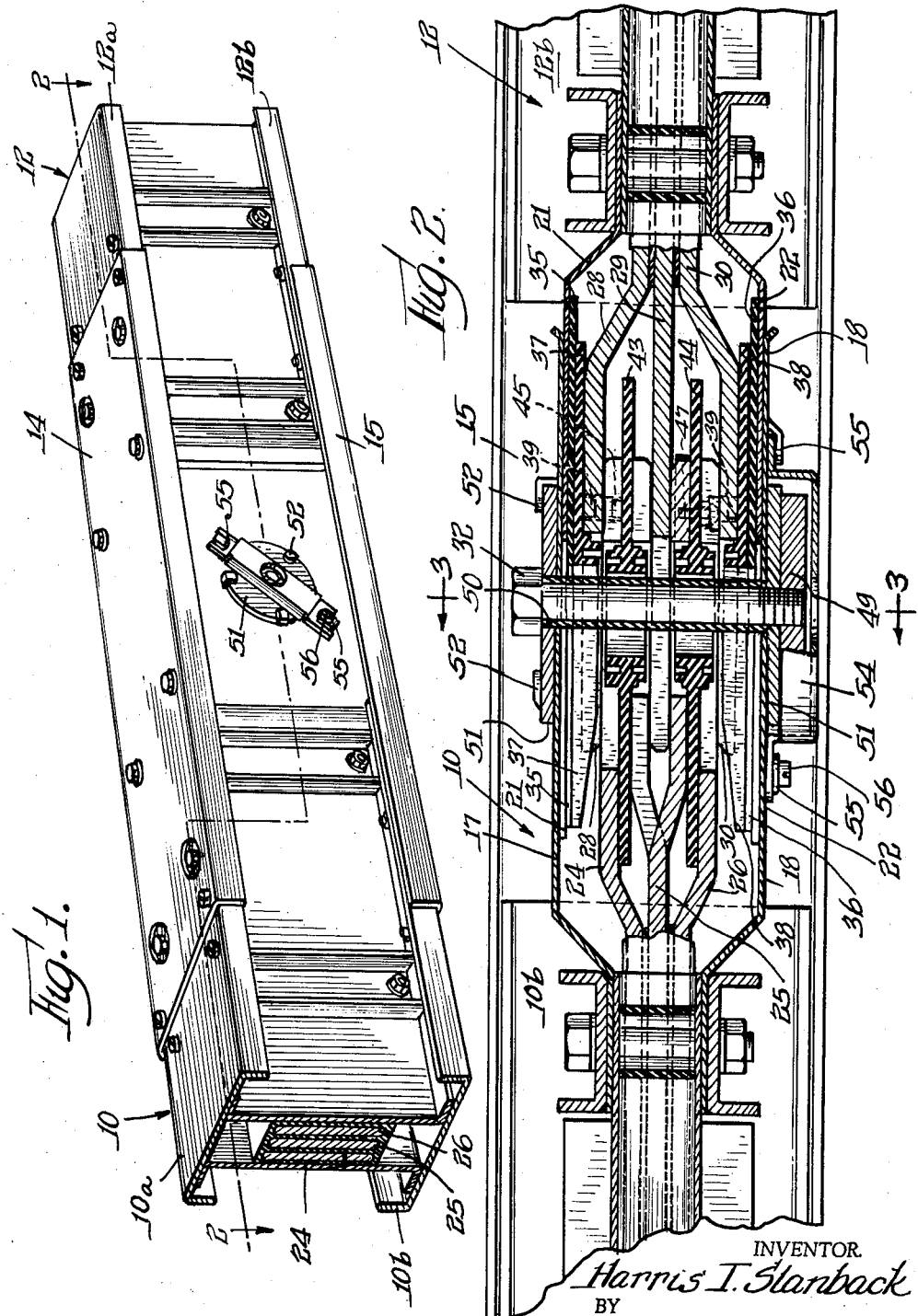

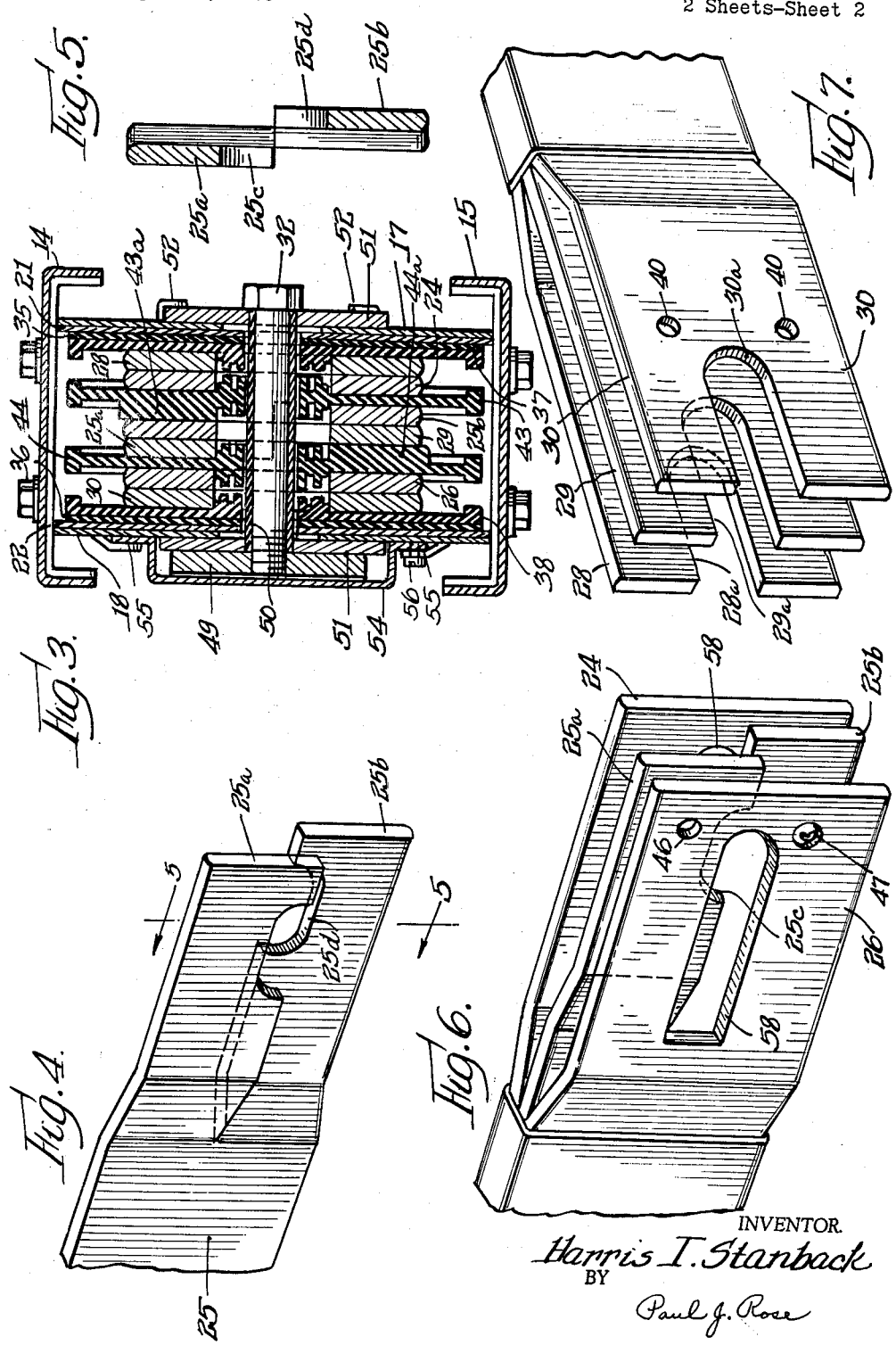

3,189,680
BUS DUCT
Harris I. Stanback, Lexington, Ky., assignor to Square D Company, Park Ridge, Ill., a corporation of Michigan
Filed Apr. 2, 1963, Ser. No. 269,971
5 Claims. (Cl. 174—88)

This invention relates generally to bus duct, and more particularly to a joint for separate bus duct sections.

An object of the invention is to provide an improved bus duct joint.

A further object is to provide an improved construction for the opposite end portions of the bus bars of a section or length of bus duct to facilitate the serial connection of like bus duct sections.

Other objects and advantages will become apparent when the following specification is considered along with the accompanying drawings in which:

FIG. 1 is a perspective view of a bus duct joint constructed in accordance with this invention;

FIG. 2 is a longitudinal sectional view taken substantially along the line 2—2 of FIG. 1;

FIG. 3 is a cross sectional view of the bus duct joint of FIG. 1 taken substantially along the line 3—3 of FIG. 2;

FIG. 4 is a perspective view of an end portion of an inner bus bar included in the bus duct joint of FIG. 1;

FIG. 5 is a sectional view taken substantially along the line 5—5 of FIG. 4;

FIG. 6 is a perspective view of an end portion of a bus bar assembly included in the bus duct joint of FIG. 1; and FIG. 7 is a perspective view of an end portion of another bus bar assembly included in the bus duct joint of FIG. 1.

FIGS. 1 and 2 show a first end portion 10 of a standard length or section of bus duct constructed in accordance with this invention, the end portion 10 being serially connected to and forming a bus duct joint with a mating second end portion 12 of another standard bus duct section also constructed in accordance with the invention. By standard length or section is meant a section of bus duct of a length as normally furnished by the manufacturer, for example, ten feet. Thus it will be understood that the end portion 10 is part of a bus duct section which may extend several feet leftward from the joint in FIGS. 1 and 2 and have a left end portion (not shown) corresponding to the end portion 12, and that the end portion 12 is part of a bus duct section which may extend several feet rightward from the joint in FIGS. 1 and 2 and have a right end portion (not shown) corresponding to the end portion 10.

The bus duct joint formed by the end portions 10 and 12 is provided with a pair of upper and lower cover channels 14 and 15 having opposite end portions secured respectively to a pair of upper housing channels 10a and 12a and a pair of lower housing channels 10b and 12b of the end portions 10 and 12. Further, the end portion 10 is provided with a pair of metal joint covers 17 and 18 which telescope over a pair of metal joint covers 21 and 22 provided on the end portion 12.

The end portion 10 includes the right end portions (FIG. 2) of three bus bars 24, 25, and 26, of substantially equal thickness, and the end portion 12 includes the left end portions of three bus bars 28, 29, and 30, of substantially equal thickness, it being understood that the unshown left end portions of the bus bars 24, 25, and 26 are respectively identical to the left end portions of the bus bars 28, 29, and 30 shown, and that the unshown right end portions of the bus bars 28, 29, and 30 are respectively identical to the right end portions of the bus bars 24, 25, and 26 shown. Thus, the bus bars 24, 26, 28, and 30 may be identical to each other, the bus bars 24 and 26 being disposed symmetrically to each other in the bus duct section having the end portion 10, and the bus bars 28 and 30 being disposed symmetrically to each other in the bus duct section having the end portion 12. Further, the bus bar 25 may be identical to the bus bar 29.

The bus bars 24, 25, and 26 interleave with the bus bars 28, 29, and 30 as shown in FIGS. 2 and 3. For this purpose, the right end portions (FIG. 2) of the bus bars 24 and 26 are outwardly offset a predetermined amount, and the left end portions of the bus bars 28 and 30 are offset an amount greater than the predetermined amount of offset of the bars 24 and 26 by the thickness of one of the bus bars. Further, the left end portion of the bus bar 29 is straight and the right end portion of the bus bar 25 is split longitudinally of the bus bar across the smaller cross sectional dimension thereof substantially centrally of the greater cross sectional dimension thereof, the split ends 25a and 25b being offset in opposite directions by the thickness of one of the bus bars.

The right end portion of the bus bar 25 is shown separately in FIGS. 4 and 5. An aperture is provided through the right end portion of the bus bar 25, the aperture including a downwardly facing recess 25c in the lower edge of the split end 25a and an upwardly facing recess 25d in the upper edge of the split end 25b.

The left end portions of the bus bars 28, 29, and 30 are provided respectively with slots 28a, 29a, and 30a opening to the ends of the bus bars, as shown in FIG. 7, for transversely receiving a bolt 32 carried by the end portion 10. Thus, the bus bars of the two end portions 10 and 12 may be interleaved without removal of the bolt 32 from the end portion 10.

The joint covers 21 and 22 of the end portion 12 become the inner joint covers of the bus duct joint when the bus duct sections having the end portions 10 and 12 are serially connected. The joint covers 21 and 22 are provided respectively with sheets of insulation 35 and 36 secured to the inner surfaces thereof in any suitable manner as by rivets (not shown). An additional pair of insulators 37 and 38 in the end portion 12 are trapped respectively between the insulation sheet 35 and the bus bar 28 and between the insulation sheet 36 and the bus bar 30, the insulators 37 and 38 being provided with raised bosses 39 (FIG. 2) received respectively in holes 40 (FIG. 7) provided in the bus bars 28 and 30. It will be understood that the inner joint covers 21 and 22, the insulation sheets 35 and 36, and the insulators 37 and 38 are provided with slots generally corresponding with the slots 28a, 29a, and 30a in the bus bars 28, 29, and 30.

In the end portion 10, a pair of insulating phase barriers 43 and 44 are provided respectively between the bus bar 24 and the split end 25b of the bus bar 25 and between the bus bar 26 and the split end 25a of the bus bar 25, the barriers 43 and 44 being provided with raised bosses 45 (FIG. 2) received respectively in holes 46 (FIG. 6) provided in the bus bars 24 and 26. Preferably the barriers 43 and 44 are tightly secured respectively to the bus bars 24 and 26 by screws, such as a screw 47 (FIGS. 2 and 6), threaded into the barriers 43 and 44 and countersunk in the bus bars 24 and 26.

After the end portions 10 and 12 are assembled, the joint may be tightened by turning of the bolt 32 which is threaded into an elongated nut 49 and provided with an insulating sheath 50. Good electrical contact may thus be established respectively between the bus bar 24 of the end portion 10 and the bus bar 28 of the end portion 12, between the split ends 25a and 25b of the bus bar 25 of the end portion 10 and the bus bar 29 of the end portion 12, and between the bus bar 26 of the end portion 10 and the bus bar 30 of the end portion 12. The joint tightness may be maintained, despite repeated expansion and contraction of the parts, by a pair of spring washers 51 held captive on the outer surfaces of the joint covers 17 and 18 of the end portion 10 by a plurality of bent-over tabs 52 sheared from the joint covers. The nut 49 is held captive in a nut holder 54 secured to the outer surface of the joint cover 18 by a pair of bent-over tabs 55 sheared from the joint cover and a screw 56 threaded into a flange of the nut holder through one of the tabs 55.

The outer bus bars 24 and 26 of the end portion 10 are respectively provided with a pair of slots 58 (FIG. 6) for receiving the bolt 32 which also extends through the recesses 25c and 25d in the split ends 25a and 25b of the bus bar 25 and through appropriate holes in the joint covers 17 and 18, the spring washers 51 and the phase barriers 43 and 44. The same die used to form the holes 40 and the slots 28a, 29a, and 30a in the bus bars 28, 29, and 30 may be used to form the holes 46 and slots 58 in the bus bars 24 and 26.

The phase barriers 43 and 44 are identical but inverted with respect to each other, a raised or thickened portion 43a (FIG. 3) on the barrier 43 filling the space above the split end 25b of the bus bar 25, and a raised or thickened portion 44a on the barrier 44 filling the space below the split end 25a of the bus bar 25.

It will be seen that an improved bus duct structure has been provided which permits easy connection of like bus duct sections and that a single bolt with a captive nut and spring washers may be tightened to establish good electrical connections between the respective bus bars of the separate bus duct sections. Further, large areas of mechanical contact are also provided between the various insulators, bus bars, and joint covers for good heat dissipating ability at the joint.

Various modifications may be made in the structure disclosed without departing from the spirit and scope of the invention.

I claim:

1. A bus bar assembly comprising an inner flat elongated bus bar having an end portion split longitudinally of the bus bar across the smaller cross sectional dimension thereof to form two separate end portions, said two separate end portions being offset in opposite directions parallel to said smaller cross sectional dimension to define a space therebetween of a width substantially equal to the thickness of the bus bar, and a pair of outer flat elongated bus bars disposed on opposite sides of said inner bus bar in relatively closely spaced flatwise relationship thereto, each of said outer bus bars having a pair of longitudinally opposite first and second end portions, the first end portion being outwardly offset a predetermined amount and the second end portion being outwardly offset an amount greater than said predetermined amount of offset of said first end portion by an amount substantially equal to the thickness of the bus bar.

2. A bus duct joint comprising a pair of separate serially connected lengths of bus duct, each of said lengths of bus duct having three flat elongated relatively closely spaced bus bars disposed in flatwise stacked relationship to each other, all six of the bus bars being of substantially the same thickness, the center bus bar of one of said lengths of bus duct having an end portion which is adjacent the other of said lengths of bus duct and is split longitudinally of the bus bar across the smaller cross sectional dimension thereof to form two separate end portions, said two separate end portions being offset in opposite directions parallel to said smaller cross sectional dimension to define a space therebetween of a width substantially equal to the thickness of one of said bus bars, the center bus bar of said other of said lengths of bus duct having an end portion which is adjacent said one of said lengths of bus duct and is straight and is electrically connected to and received in said space between said two separate oppositely offset end portions of said split end portion of said center bus bar of said one of said lengths of bus duct, the two outer bus bars of each of said lengths of bus duct having equally, oppositely and outwardly offset end portions adjacent the other of said lengths of bus duct, and said end portions of the two outer bus bars of one of said lengths of bus duct being respectively offset more than said end portions of the two outer bus bars of the other of said lengths of bus duct by an amount substantially equal to the thickness of one of said bus bars and being respectively electrically connected thereto and interleaved therewith.

3. A bus duct joint as claimed in claim 2, wherein the interleaved end portions of the bus bars of said connected lengths of bus duct have a single bolt extending, said bolt being mounted in the end portions of the three bus bars of one of said lengths of bus duct, and the end portions of the three bus bars of the other of said lengths of bus duct are provided with open-ended slots extending longitudinally of the bus bars, said bolt being received in said slots, whereby the bus bars of the two lengths of bus duct may be interleaved without removal of said bolt from said one of said lengths of bus duct.

4. A bus duct joint as claimed in claim 3, wherein said bolt is provided with an elongated nut held captive and prevented from rotating by a nut holder secured to said one of said lengths of bus duct.

5. A bus duct joint as claimed in claim 2, wherein a pair of phase barriers are provided respectively adjacent the outer surfaces of the two separate oppositely offset end portions formed by said split in the center bus bar of said one of said lengths of bus duct and the phase barriers are respectively provided with raised portions edgewise aligned with said separate end portions formed by said split and having a thickness substantially equal to the thickness of one of said bus bars.

References Cited by the Examiner

UNITED STATES PATENTS 3,115,379  12/63  McKee _____ 339—47

JOHN F. BURNS, Primary Examiner.

JOHN P. WILDMAN, E. JAMES SAX, Examiners.